United States Patent
Vinsani et al.

[15] 3,649,910
[45] Mar. 14, 1972

[54] METHOD AND APPARATUS FOR GENERATING DIAGNOSTIC INFORMATION

[72] Inventors: Mario Vinsani; Angelo Carnevale, both of Milan, Italy

[73] Assignee: Honeywell Information Systems Italia S.p.A., Caluso, Turin, Italy

[22] Filed: Feb. 10, 1970

[21] Appl. No.: 10,254

[30] Foreign Application Priority Data

Feb. 12, 1969 Italy ..................12751 A69

[52] U.S. Cl. ..............................................324/73
[51] Int. Cl. ...........................................G01r 15/12
[58] Field of Search ....................................324/73

[56] References Cited

UNITED STATES PATENTS 3,492,572 1/1970 Jones et al. ..............................324/73

OTHER PUBLICATIONS

Cargile; Hewlett-Packard Journal; March 1969; p. 14–20.

*Primary Examiner*—Alfred E. Smith
*Attorney*—George V. Eltgroth, Lewis P. Elbinger and Frank L. Neuhauser

[57] ABSTRACT

A system for generating a fault dictionary for electronic equipment, wherein apparatus is provided for selectively replacing integrated circuit units of the apparatus with fault generating devices adapted to be controlled to simulate various faults of the integrated circuit unit replaced, and wherein, for each fault simulated, a sequence of diagnostic signals is applied to the equipment, selected output indicia of the equipment are sensed, and when such indicia deviate from the corresponding indicia for correct operation such output indicia are recorded as symptoms of the corresponding fault.

5 Claims, 22 Drawing Figures

PATENTED MAR 14 1972
3,649,910
SHEET 1 OF 7
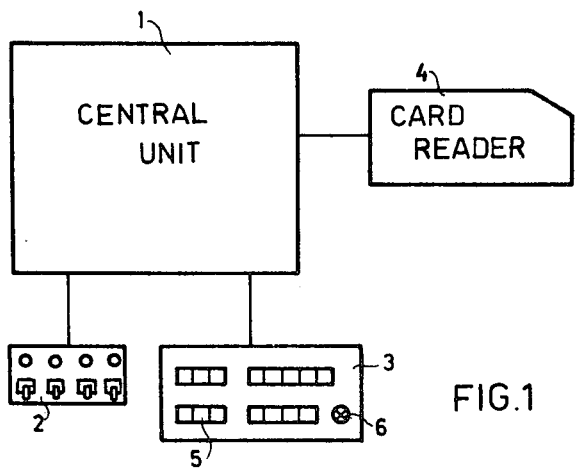
FIG.1
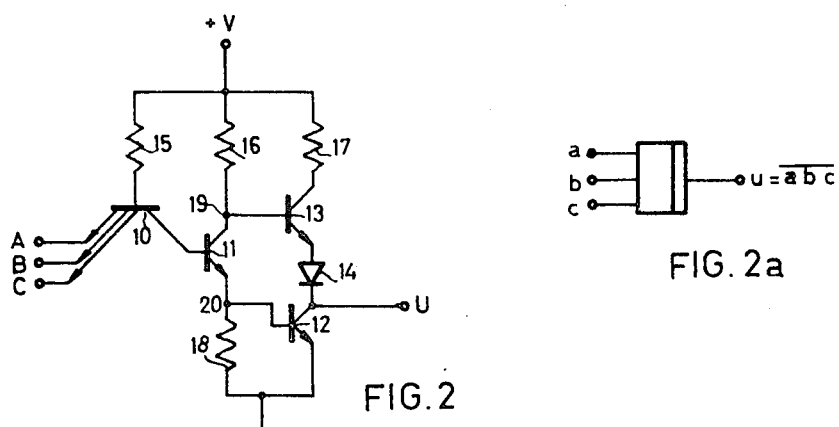
FIG.2
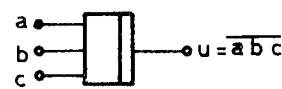
FIG.2a
FIG.3
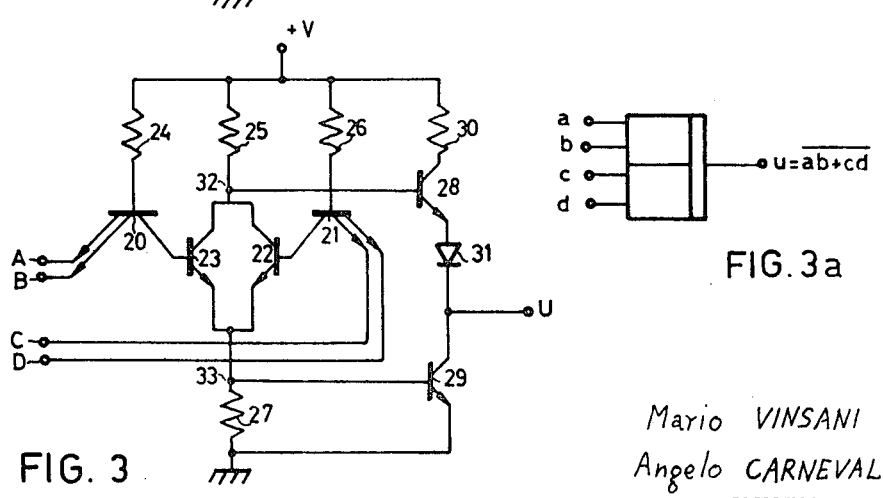
FIG.3a
Mario VINSANI
Angelo CARNEVALE
INVENTORS.
BY *Lewis P.C. Ettinger*
ATTORNEY.

Mario VINSANI
Angelo CARNEVALE
INVENTORS.

Mario VINSANI
Angelo CARNEVALE
INVENTORS.

METHOD AND APPARATUS FOR GENERATING DIAGNOSTIC INFORMATION

BACKGROUND OF THE INVENTION

This invention relates to diagnostic means for detecting and identifying the faults in electronic data processing devices, and more particularly to means for preparing lists of correlations between symptoms and faults.

In accordance with modern technology, data processing apparatus is made by assembling, on printed circuit boards, a number of related integrated circuit units; i.e., units comprising a plurality of semiconductor circuits fabricated on the same support and contained in the same package. The number of different types of such integrated circuit units is relatively small. However, the circuits which are part of such units are interconnected in various manners, and connected with the circuits of the other circuit units of the same board. Therefore, a number of different types of boards, usually greater than the number of different types of circuit units, is obtained.

The boards are connected by multiple pin connectors to the wiring of the electronic apparatus.

The employment of these integrated circuit units, even though reducing the cost and size of the data processor, causes great difficulty in the task of detecting and identifying the faults which may affect it. The Italian Pat. No. 845,224, filed Oct. 10, 1968 and owned by the assignee of the instant application, described a device for identifying the faults in integrated circuit units located on the same board. However, the problem remains of being able to immediately identify the board, or group of boards, which carry the faulty component.

It is known in the art to use a diagnostic process consisting of applying to the input terminals of the apparatus a succession of sets of input signals, and checking whether every corresponding set of output signals at the output terminals is the one expected under correct operation; and when the wrong output set occurs to attempt to identify the nature and location of the fault as a function of the observed discrepancies between the actual set of output signals and the correct set.

It is usually necessary to submit to such a diagnostic process the central processing unit of a data processing apparatus. The central processing unit normally comprises a main memory, a control unit, an arithmetic unit and a number of registers for temporarily storing single sets of signals. These registers are usually formed of bistable multivibrators, or flip-flops. Moreover, in some registers, the state of each of the flip-flops controls the on/off condition of a corresponding lamp in a set of lamps. These lamp sets, located on the maintenance console, provide the operator with information on the state of each flip-flop in these registers.

The combination of the on/off conditions of the lamps of these registers may be considered as a combination of output signals from the entirety of the circuits forming the central processing unit, and every discrepancy between the actual set of such output signals, as observed for a given input signal set, and the correct set, may be considered as a part of a "fault symptom."

To be able to trace back the fault from the symptom, it is necessary to have a list of correlations between symptoms and faults. This correlation list may be prepared by empirical means if the circuits to be tested are very simple and have few discrete components. It is possible, in this case, to physically provide a number of faults, one at a time, and to identify the symptoms which are obtained when a check program, that is a sequence of input signals suitable for detecting any possible fault, is applied to the input terminals.

However, this method cannot be employed satisfactorily in case of relatively complex circuits, and it is absolutely inadequate for the central processing unit of a data processing apparatus. In this instance, the method employed in the present state of the art is to simulate the entire circuit of the central processing unit in the memory of a computer, by means of a proper program to simulate the various possible faults, and, with a diagnostic program to obtain the related symptoms. This process demands increasingly time-consuming programming and operation efforts, the more complex is the structure of the central unit for which it is desired to establish the correlation list between symptoms and faults, such correlation list hereinafter being called a "fault dictionary."

Therefore it is the object of this invention to provide an improved system for deriving fault dictionaries for data processing apparatus.

Another object of the invention is to provide an improved method for deriving fault dictionaries for data processing apparatus.

SUMMARY OF THE INVENTION

The present invention eliminates a substantial part of the programming efforts directed to the simulation of the circuits and the related faults. Using an appropriate electronic fault-generating device modifications corresponding to the possible faults are physically produced in the central unit under test by control signals transmitted to said device, for example by means of a pilot electronic computer suitably connected to the central unit under test.

These modifications are provided by a device which is connected to a socket into which an integrated circuit unit of a given type may be plugged and causes, under control of signals from the pilot computer, alterations such as interruptions or shortcircuits in the circuits external to the integrated circuit units. These alterations cause the same anomalies in the behavior of the circuit units as would be caused by internal faults of units.

By a suitable program the pilot computer successively:

a. orders the operator to plug a selected integrated circuit unit into the socket of the device,
b. causes a predetermined succession of alterations in the operation of this integrated unit and, for each one of these alterations, applies a diagnostic program to the input of the central unit,
c. records the symptoms corresponding to each alteration in the programmed succession of alterations provided for a given integrated circuit unit, and
d. subsequently orders the operator to plug a different integrated circuit unit into the socket of the device and then repeats this succession of operations.

At the end of this procedure, the memory of the pilot computer contains a correlation list between symptoms and faults, which list, suitably rearranged and processed, originates the fault dictionary. Such fault dictionary is a tabulated printout, which indicates for each symptom the fault, or faults, which cause the symptom and identifies the faulty unit and its location.

For less complicated circuits, simpler means of controlling the generation of the faults and for recording the symptoms may be used in place of the pilot computer. Such means may comprise a card reader and a card perforator, suitably connected to the device under test. This method of using a fault-generating device is also useful for obtaining the fault dictionary by means of purely manual operations.

BRIEF DESCRIPTION OF THE DRAWING

The invention will be described with reference to the accompanying drawing, wherein:

FIG. 1 is a block diagram of an arrangement for detecting the faults in a central unit of a data processing apparatus, FIG. 2 is a schematic diagram of a NAND elementary integrated circuit, FIG. 2a illustrates a symbol used for the NAND circuit, FIG. 3 is a schematic diagram of a NAOR elementary integrated circuit, FIG. 3a illustrates a symbol used for the NAOR circuit.

DESCRIPTION OF THE PREFERRED EMBODIMENT

Figure 4:
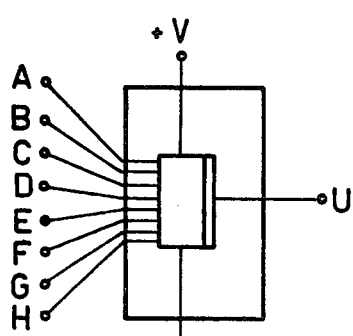
FIGS. 4 to 8 are logical diagrams of five different types of integrated circuit units.

To clarify the basic concepts of the present invention, it is useful first to describe the procedure for testing an electronic apparatus, particularly the central unit, or central processing unit, of an electronic data processor, in accordance with the invention, assuming that the operator testing the apparatus is already provided with a suitable diagnostic program and a fault dictionary. Then, the apparatus used for producing the circuit alterations which simulate the faults will be described and, finally, the system organizations used for obtaining the fault dictionary will be outlined.

It is assumed that, generally, the circuits of the central processing unit under test are formed by printed circuit boards, on which integrated circuit units are located. Each board is identified by an alphabetic and/or numeric symbol, which indicates its position in the apparatus. Each integrated circuit unit is characterized by another symbol which denotes its location on its supporting board.

TEST PROCEDURE

The apparatus used to carry out the test procedure is shown in FIG. 1. A central unit 1, which is the unit under test, is connected to a card reader 4 and is provided with a control keyboard 2 and a display panel 3. The display panel comprises a number of displays, each one corresponding to a register, and contains as many lamps 5 as there are register memory elements, which are usually flip-flops.

The lamp connected to each flip-flop is on if the flip-flop stores a binary ONE, and is off if a binary ZERO is stored therein.

The diagnostic program, according to the invention, is, for instance, recorded on a stack of perforated cards, each card carrying, generally, a partial program for diagnostically stimulating a network portion of the central unit. In addition, each card carries the correct binary values expected to be stored in the registers used as output members of the network portion at the conclusion of the partial program.

As each card is read by the reader, its partial program is stored in the memory; afterward, an appropriate sequence of signals is read out from the memory and entered into suitable input registers, thus diagnosticalLY stimulating the network portions. At the end of this sequence of signals, the contents of the output registers of the network portion is compared with the expected correct values stored in the memory. Each discrepancy between the pattern of signals in the output registers of the network portion and the expected pattern inhibits the reading of the following card, thereby stopping the flow of the cards. The entire stack of cards contains a complete diagnostic program capable of testing the complete network forming the central unit, or at least a substantial part of such network. When the flow of the cards halts, the current pattern of values stored in the output registers is determined by observation of the pattern of the lighted and unlighted lamps.

A single symptom is generally insufficient to identify a fault and its location. Thus, it is possible, after the diagnostic program has been halted, to force the reading of the following card by appropriate intervention from the control console, thereby letting the card reader resume the reading of the card stack. Generally, this operation will cause a particular number of cards to be read before the reading operation is again halted. The new pattern of lighted lamps on the display panel offers a new symptom. It is therefore possible to read the entire stack of cards, collecting a number of symptoms which are usually sufficient to identify a fault.

The halting of the card reading operation does not necessarily signify the stopping of the operation taking place in the central unit under test. Thus, certain faults, although causing halting of the reading of the card stack due to a discrepancy between the correct and actual values stored in the output registers, do not arrest the operation of the central unit, which operation repeats itself continually. This condition may be detected by the fact that some lamps go on and off intermittently or by the fact that a lamp provided for signalling the stopping of the central unit, does not light. This lamp is called the HALT lamp. The fault detection procedure on the unit under test proceeds as follows:

a. The operator loads the card reader with the card stack containing the diagnostic program, and carries out the operations required for initiating reading of the stack. If the entire stack is read without stopping, either the unit is fault-free or there may be a fault that cannot be detected by such diagnostic program.

b. Generally, if there is a fault, the reading of the card stack will stop, for example at the card having a serial number $n$. The operator notes this number, the state of the HALT lamp, and the pattern of lighted lamps on the different displays. If the HALT lamp is off, which means that the unit continues to operate cyclically, some display lamps will intermittently turn on and off, and this can be used as a symptom; however, generally it will be convenient for the operator to observe, using an oscilloscope, whether at the outputs of certain registers continuous or alternating signals are present.

d. The operator, pressing a suitable button, causes the reading of the following card. Usually, the reading of the stack will continue until the card having a serial number $m$ (which is frequently equal to $n+1$) causes a new halt. The operator then notes the new pattern of lighted lamps and, in particular, the state of the HALT lamp.

e. Usually, these operations are repeated as many times as necessary to read the entire stack of cards.

At the end of the procedure, a number of symptoms may have been collected, each symptom corresponding to a halt in the reading operation and including the serial number of the last card read before stopping, the state of the HALT lamp, and the pattern of the lamps lighted, extinguished, or flickering.

The operator then searches the fault dictionary for the pages corresponding to the serial numbers ($n, m \ldots$) of the cards which caused a halt in the read operation. On each such page there is provided for each of the different patterns of lamp states, the corresponding fault or faults. According to the degree of resolution provided in the diagnostic program, a group of boards, a single board, a number of integrated circuit units located on one or more boards, or a single integrated circuit unit will be indicated as a seat of the fault. In the last-named case it is possible to immediately replace the faulty integrated circuit unit, whereas in the other cases it will be possible to identify the faulty circuit unit on the board or boards indicated, using a device for locating faulty units on a printed circuit board such a device being described in the patent application Ser. No. 866,804 filed Oct. 16, 1969 by Georges Kassabgi and Mario Vinsani for a SYSTEM FOR AUTO- MATICALLY CHECKING BOARDS BEARING INTEGRATED CIRCUITS and assigned to the assignee of the present invention.

In most instances, it will not be necessary to follow the entire procedure as described. For instance, when reading stops at the card having serial number $n$, the operator may immediately determine in the fault dictionary whether this data is enough for identifying the faulty unit, or whether he must continue to gather more data. Alternatively, after a first reading of the entire stack, during which the operator records only the numbers of the cards which have caused halts, without concerning himself with the state of the lamps, the operator may determine in the fault dictionary whether these partial symptoms are sufficient for the indentification of the faults; otherwise, he may proceed through a second reading of the stack to determine the state of the lamps which can identify the fault.

THE FAULT-GENERATING DEVICE

The fault-generating device is basically a device for providing for the substitution of each integrated circuit unit of the processor under test with a fault-generating unit, and adapted to cause, in the circuit provided in the fault-generating unit, alterations which have the same logical effects as faults which may affect the integrated circuit unit.

By way of example, it is assumed that the circuits of the central processing unit under test use integrated circuit units of the type commonly called "transistor-transistor logic," usually abbreviated is TTL.

It is assumed further that the elementary circuits employed are the circuits shown in the diagrams of FIGS. 2 and 3. The first circuit provides the logical function NAND, using a multiemitter transistor 10 and an output circuit portion comprising single-emitter transistors 11, 12, and 13, and a diode 14. This circuit comprises, in addition, four resistors 15, 16, 17, and 18 of suitable value connected as indicated.

The logical value ONE is assumed to be represented by a positive voltage, for instance +3 v. and the logical value ZERO by 0 v. If at least one of emitters A, B, and C of the multiemitter transistor 10 is at 0 v., its base is at 0 v. This voltage, coupled through the collector connected to the base of transistor 11, causes the latter to be nonconductive. Therefore, the collector of transistor 11 (point 19) is at +3 v., whereas its emitter (point 20) is at 0 v. Transistor 13 is thereby conductive (on) and transistor 12 is off. Output U is at a substantially positive voltage, approximately +3 v.; that is, representing a logical value ONE. Conversely, if all emitter inputs A, B, and C are of value ONE, that is approximately at +3 v., a current flows from the voltage source +V through resistor 15, the base of transistor 10 and the base of transistor 11, which therefore is on. Point 20 is at a positive voltage sufficient to make transistor 12 conductive whereas point 19, although at a slightly more positive voltage, is unable to make transistor 13 conductive because of the voltage drop across diode 14. Thus transistor 13 is off, and the output is at 0 v., that is, representing a logical ZERO.

The circuit of FIG. 2 provides, therefore, the logical function NAND, as indicated by the boolean equation $$u=\overline{abc}$$

where $u$ is the value of the boolean variable at the output U, and $a$, $b$, and $c$ are the values of the variables at the inputs A, B, and C.

The circuit of FIG. 3 provides the AND-OR-NOT function, abbreviated as NAOR. It comprises two multiemitter transistors 20 and 21, two single-emitter transistors 22 and 23, and resistors 24, 25, 26, and 27 forming the input circuit portion; and transistors 28 and 29 forming with a resistor 30 and a diode 31 the output circuit portion. For either transistors 22 or 23 to be on, it is necessary, as shown heretofore, that both inputs of the respective transistors 21 and 22, be at the value ONE. If either or both of transistors 22 and 23 are on, point 33 is at a relatively high positive voltage, controlling transistor 29 to be on, whereas, because of the voltage drop across diode 31, the voltage of point 32 is not sufficiently positive and transistor 28 is off. In this instance output U represents the ZERO value.

If at least one of the inputs of transistor 20 and at least one of the inputs of transistor 21 are at 0 v. (logical ZERO), both of transistors 22 and 23 are off. Therefore, point 33 is at 0 v., transistor 29 is off, point 32 is at a relatively high positive voltage, and transistor 28 is on. Thus, the output U is approximately at +3 v.; that is, representing a logical ONE.

The circuit of FIG. 3 therefore provides the function indicated by the boolean equation $$u=\overline{ab+cd}$$

FIG. 2a and 3a show respectively the symbols which will be used for the circuits of FIGS. 2 and 3.

It may be noted that the logical value ONE at any input may be obtained simply by isolating the input terminal from the preceding circuit.

Figure 5:
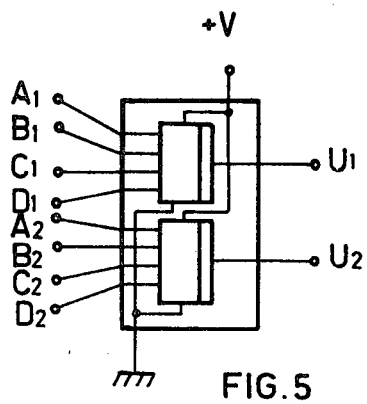
Figure 6:
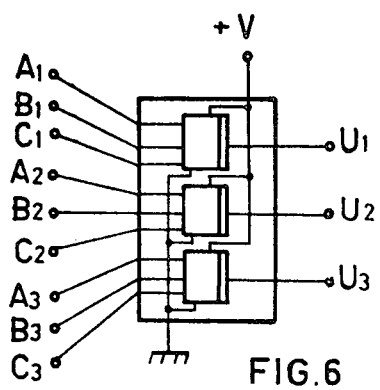
Figure 7:
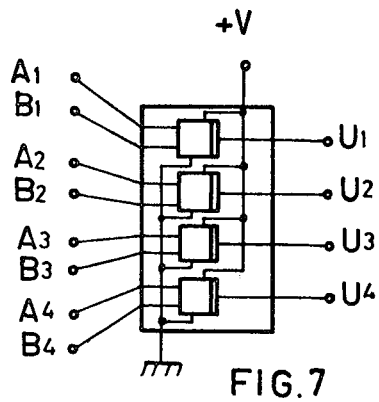

The circuits of FIGS. 2 and 3 may be differently grouped to form different integrated circuit units. For instance, integrated circuit units comprising a single NAND circuit having eight input leads are shown in FIG. 4, comprising two NAND circuits, each having four input leads are shown in FIG. 5, comprising three NAND circuits, each having three input leads are shown in FIG. 6, and, comprising four two-input NAND circuits are shown in FIG. 7. The NAOR integrated circuit units may comprise two four-input NAOR circuits, FIG. 8.

Different combinations and interconnections of the five exemplary integrated circuit units give rise to a number of different types of printed circuit boards.

In FIGS. 4 to 8, in addition, the output, the supply voltage, and the ground leads are indicated. It may be seen that the maximum number of terminals required for any one of the illustrated integrated circuit units is 14, for the integrated circuit unit of FIG. 6. This is also the number of connection pins of the integrated circuit units of each type.

Every fault which can affect the integrated circuits internal to a unit is demonstrated external thereto by definite steady logical values present at given input and output terminals, independent of the logical values present at the other terminals. It is therefore possible to simulate the internal fault conditions by applying fixed logical values at proper leads. From these considerations, it is possible to minimize the number of alterations produced in the external circuit to simulate the different fault conditions; instead, it is sufficient to produce only those alterations which apply to the terminals the proper steady values, whatever may be the physical nature and cause of the internal failures.

Thus, in the NAND circuit of FIG. 2, it may be seen that a fault causing a fixed ZERO on any one of the inputs causes also a fixed ONE on the output. Again, the breakdown of the supply voltage causes the isolation of all inputs and the output; the lack of a connection to ground brings all inputs and the output to a voltage near the supply voltage. In both instances the logical value of the inputs and of the output is that of a fixed ONE. A fixed ZERO on the output may be considered as a ZERO on the input of a following circuit, and therefore as a fixed ONE on its output.

Finally, it has been found experimentally that most of the faults which can accidentally affect the interior of an integrated circuit, due to fabrication defects and similar reasons, cause a fixed ONE at the output. It follows that, for the integrated units shown by the FIGS. 4 to 7 comprising only NAND circuits, every fault caused by breakages or wrong connections to ground of the connecting pins and leads may be reduced either to a fixed ONE on one of the input or output terminals, or on a fixed ONE on all input and output terminals. Therefore, all alterations in the connection pattern which have to be made in order to simulate all possible faults, are limited either to a single interruption of one of the input or output connections, or to the multiple interruption of all input and output connections.

For the NAOR circuit of FIG. 3, what has been said above is valid for single faults caused by a fixed ONE on an input or output lead, and for the multiple fault due to the lack of supply voltage or ground. However, a fixed ZERO on one of the AND inputs (that is on one of the emitters of the multiemitter transistors) does not necessarily cause a fixed ONE on the output.

This type of fault must be simulated by an alteration of the input connection between ground and isolation from the preceding circuit. It is evident that it is adequate to cause such a fault on only one of the inputs of each AND circuit, because if one of the inputs is ZERO, the value of the other one is immaterial.

In summary, the alterations to be carried out on the circuits connected to the terminals of the integrated circuit units are as follows:
  a. for circuit units of all types:
    interrupt the connection to each one of the terminals, one at a time
    interrupt the connection to all terminals, at the same time
  b. for the circuit units of FIG. 8, in addition, alternately interrupt and ground the connection of one of each pair of input terminals.

Figure 8:
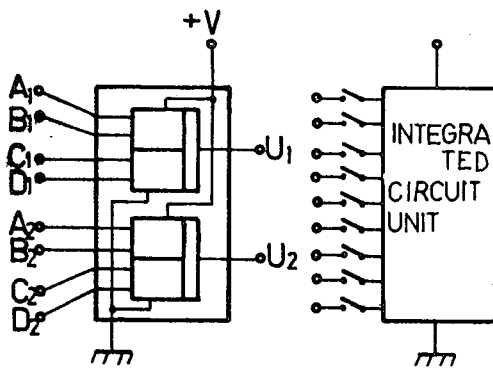
Figures 9, 10:
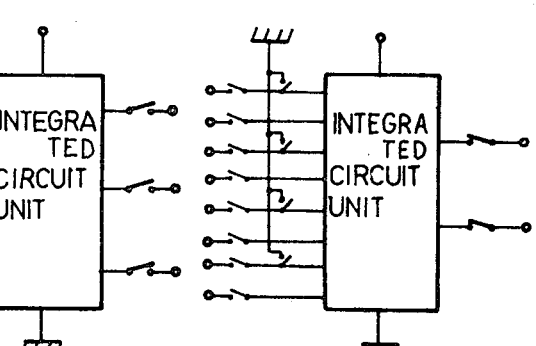
FIGS. 9 to 10 are diagrams of the arrangement of the switches for simulating the faults on the input leads of the integrated circuit units.

FIGS. 9 and 10 schematically represent as switches the devices capable of producing such alterations. The diagram of FIG. 9 applies to circuit units of the types of FIGS. 4 to 7, and the diagram of FIG. 10 applies to a circuit unit of the type of FIG. 8.

Figure 11:
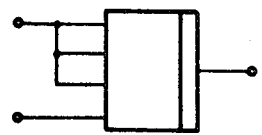
FIGS. 11 and 12 illustrate two cases of redundant connections.

It may often occur, for instance in a four-input NAND circuit in which only two inputs are required that the remaining inputs are parallel connected to one of the utilized inputs (FIG. 11). There is in this instance a redundance of connections between the internal and the external circuit, so that the accidental breakage of one of such redundant connections does not appear as a fault and therefore cannot be detected.

Figure 12:
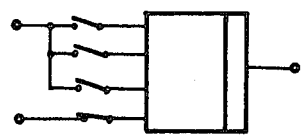
Figure 13:
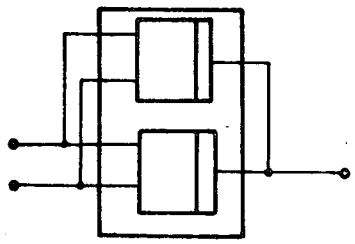
FIGS. 13 and 14 are diagrams of the arrangement of the switches for simulating the faults in the instances of redundant connections.
Figure 14:
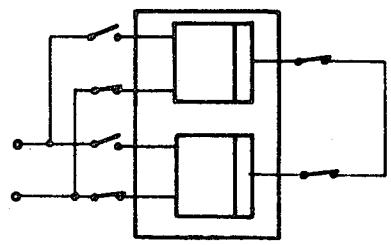

To simulate the interruption of only one of such terminals is of no value in setting up the fault dictionary. It will be necessary, in this case, to open all parallel connections, thus effectively causing the fault (FIG. 12). Thus, if two or more circuits contained in the same unit are parallel connected, as shown by FIG. 13, each fault should be simulated, not on a single one of these circuits, but on all corresponding terminals of all parallel-connected units (FIG. 14).

Every integrated circuit unit is enclosed in a suitable package provided in the indicated example with 14 pins, and is located on a printed circuit board where the pins are soldered to respective leads. To permit the insertion of the fault-generating device, it is necessary to provide substitute support member, that is, special boards into which the integrated circuit units are plugged in suitable sockets and from which they may be manually unplugged.

Figure 15:
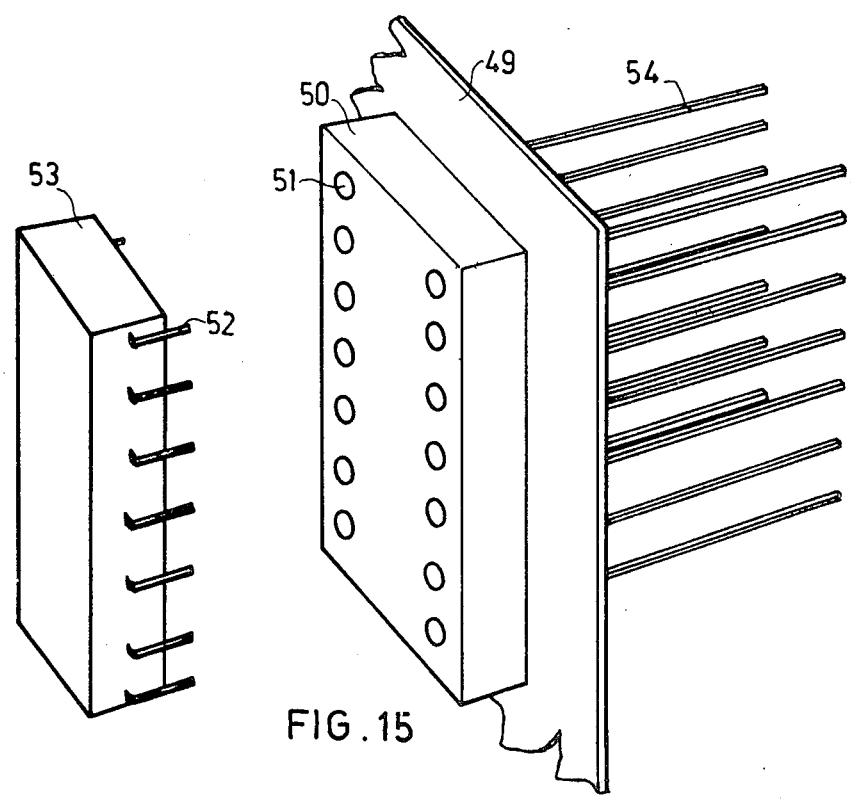
FIG. 15 is a schematic perspective representation of a portion of a printed circuit board predisposed for the substitution of the integrated circuit units.

In FIG. 15 a portion of one of these special boards 49 is shown. Each one of the locations, which on a normal board is occupied by an integrated circuit unit, on board 49 is occupied by a socket 50 provided with 14 plugs 51, corresponding to the 14 pins 52 of integrated circuit unit 53. Such plugs are prolonged on the opposite face of the board as protruding pins 54, which are soldered to the printed wiring of the board 49 in such a way that when integrated circuit unit 53 is plugged into socket 50, the operation of the board does not differ from that of a normal board.

Figure 16:
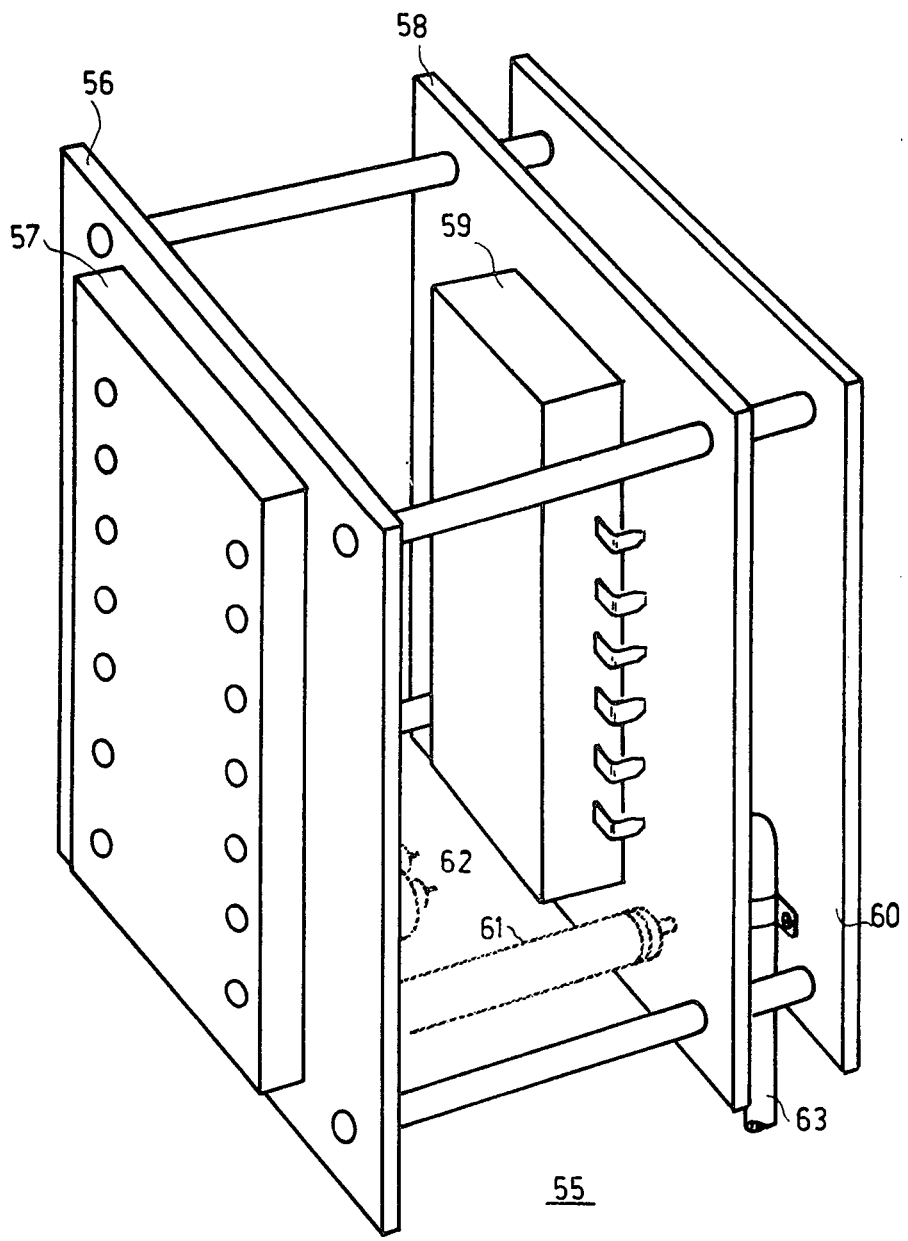
FIG. 16 is a schematic perspective representation of a fault-generating device.

The protruding pins 54 permit the plugging in of a fault-generating device 55, schematically represented in FIG. 16. It comprises an upper plate 56 on which a socket 57, capable of being connected to protruding pins 54 is affixed.

An intermediate plate 58 carries an integrated circuit unit 59 of the same type as integrated circuit unit 53. The pins of integrated circuit unit 59 are connected to the plugs of socket 57 through a discrete component circuit comprising resistors and transistors, some of which (61, 62) are outlined by broken lines in FIG. 16. Such transistors and resistors operate as switches for producing the circuit alterations which simulate the faults. The wires for controlling such switches, and other additional wires are contained in a cable 63 fixed to a backplate 60. The entire device 55 is enclosed in a suitable protection box, not shown.

The number of types of fault-generating devices 55 is equal to the number of types of integrated circuit units; i.e., five in the example considered. A number of special test boards 49, equal to the number of types of normal printed circuit boards, must be provided. Such number may be a multiple of 10. The normal board, the faults of which must be simulated, is unplugged from its connector and test board 49, having all the integrated circuit units plugged into its sockets is plugged in place of the normal board with the interposition of an extension board to permit the special board to protrude from among the adjoining boards, thus providing accessibility to integrated units borne thereon.

The particular integrated circuit unit, the faults of which must be simulated is removed from its socket and the socket of the proper type fault-generating device 55 is plugged into the protruding pins.

If no control signal is sent to the fault-generating device, the central processor should operate correctly; however, any proper control signals cause modifications of the circuit which simulate the desired faults.

Figure 17:
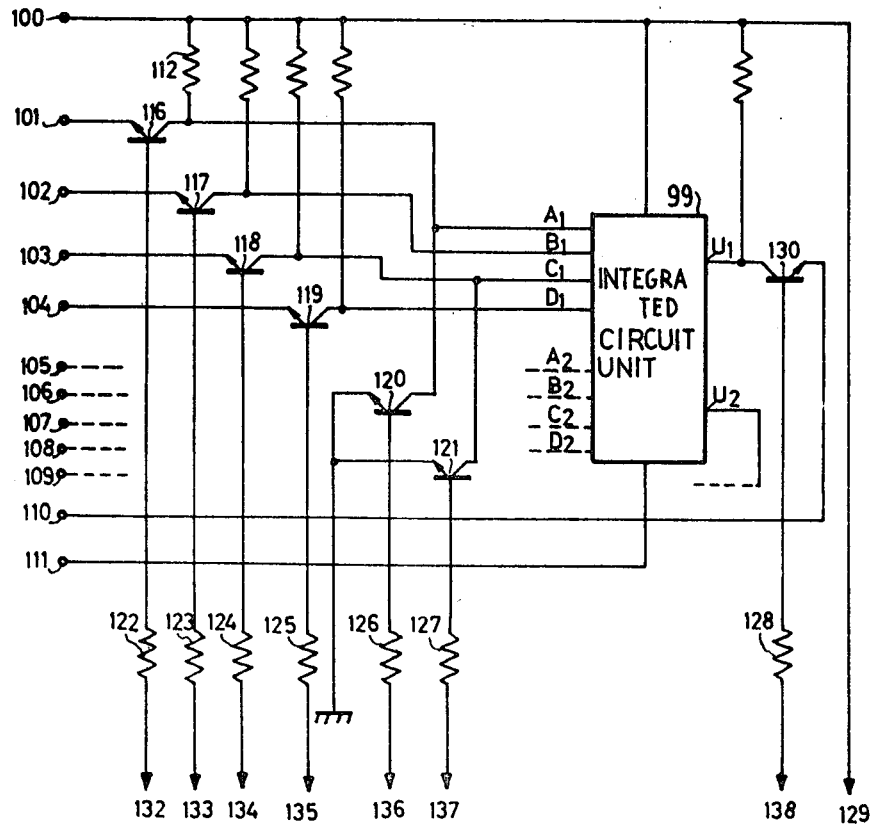
FIG. 17 is a schematic diagram of the circuit for generating faults.

FIG. 17 partially represents the circuit diagram of a fault-generating device of the type wherein the integrated circuit unit for which faults must be simulated is that of FIG. 8, which comprises two NAOR circuits. The integrated circuit unit is indicated in FIG. 17 by the reference number 99. As specified previously, to simulate all possible faults of this unit it is necessary, in addition to interrupting the connections to the terminals, to be able to ground four out of the eight input leads; for example, these connected to pins $A_1$, $C_1$, $A_2$ and $C_2$. The 12 plugs of socket 57 (FIG. 16) employed by this type of circuit unit are represented in FIG. 17 by 12 circles denoted by reference numerals 100 to 111. In the drawing the connections between such plugs and the pins of circuit unit 99 are indicated only for the supply voltage plug 100, the ground plug 111, the four input plugs 101, 102, 103, and 104, and the output plug 110, that is for the plugs which relate to a single NAOR circuit in the integrated unit. Plug 100 provides the supply voltage of the fault generating circuit, the integrated circuit unit 99, and, in addition, a voltage signal on a signalling wire 129 connected to the control circuit.

Consider now, for example, pin $A_1$ of unit 99. Pin $A_1$ is connected to plug 101 through a transistor 116, which is supplied through resistor 112 and controlled through a resistor 122 by a control wire 132. In the quiescent condition a positive voltage is present on wire 132 and is applied to the base of transistor 116, which, therefore, is on.

Pin $A_1$ is also connected to the collector of a transistor 120, the emitter of which is grounded and the base of which is controlled through a resistor 126 by a control wire 136. In the quiescent condition, a null voltage is present in wire 136, so that transistor 120 is off. Therefore the pin $A_1$ is isolated from ground.

In this condition each change in voltage, and therefore in logical value, which is applied to plug 101, is transmitted through transistor 116 to pin $A_1$. When an interruption fault must be generated equivalent to a fixed ONE on pin $A_1$ wire 132 is brought to 0 v. Transistor 116 thereupon goes off and a positive constant voltage, logical value ONE, is applied to pin $A_1$.

If, instead, a fixed logical ZERO, must be applied to $A_1$, which also must be insulated from ground, a positive voltage is concurrently applied to wire 136, thus causing transistor 120 to go on and couple $A_1$ to the ground voltage. The interruption faults may be generated on all input and output pins by means of transistors 116, 117, 118, 119, and 130, connected respectively to pins A1, B1, C1, D1, and U1, and by corresponding transistors, not shown, connected to pins A2, B2, C2, D2 and U2.

If all transistors are off, the multiple interruption fault is generated. Finally, ground faults may be generated on pins A1 and C1 by means of transistors 120 and 121, and on pins $A_2$ and $C_2$ by means of corresponding transistors, not shown. Therefore, fourteen 14 control wires are required for the circuit unit considered in the example, that which corresponds to the type shown in FIG. 8; i.e., as many as the switches shown in FIG. 10. For the other types of circuits which require only interruption faults, the number of control wires will be equal to the number of input and output wires which have a transistor operating as switch; i.e., nine for the circuit of FIG. 4, 10 for the circuit of FIG. 5, and 12 for the circuit of FIGS. 6 and 7. In addition, a signalling wire 129 is provided. On this wire, when the fault-generating device is plugged in place of the circuit unit, a positive voltage is present.

Figure 18:
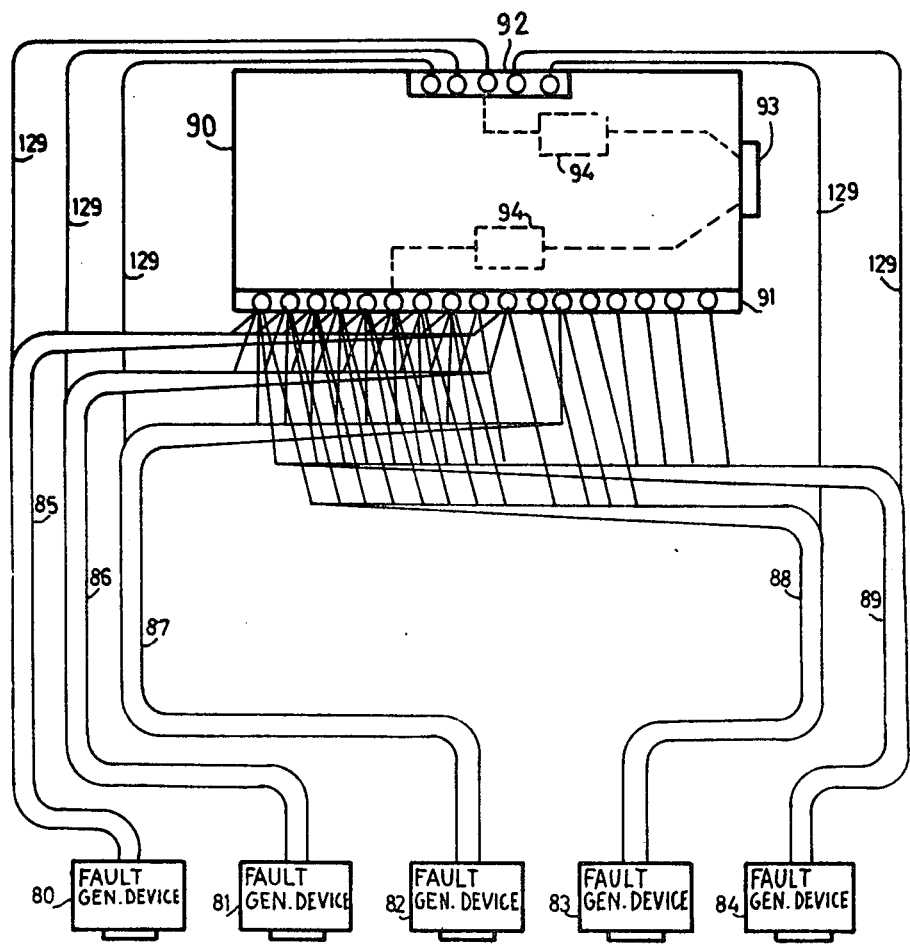
FIG. 18 is a wiring diagram of the connections of a fault-generating unit.

The fault generating unit, schematically shown by FIG. 18, comprises as many fault-generating devices 80, 81, 82, 83 and 84 as there are different types of integrated circuit units used in the processor under test (five in the illustrated example) and a connection and adaptation box 90 at which five connecting cables 85, 86, 87, 88, and 89 terminate, these cables being connected to respective ones of the fault-generating devices. Box 90 comprises, primarily, a terminal strip 91, to which the control wires of the cables 85 to 89 are connected, and a terminal strip 92, to which the signalling wires 129 associated with the five fault-generating devices are connected. On the signalling wires, as explained previously a signalling voltage is present when the associated device is plugged into the protruding pins of a special board in place of an integrated circuit unit. Because only one of the five fault-generating devices can be employed at a time, the wires of all five devices which in different fault-generating devices perform the same operation on similarly located pins may be connected in parallel. Connection box 90 is connected, by means of a multiple pin connector 93 to the fault generating control system, which receives the signals from the signalling wires and sends out the control signals on the control wires.

Between the terminals of the strips 91 and 92 and the pins of connector 93 there are appropriate amplifying and impedance adapting circuit, of which only two are symbolically shown as broken line blocks 94.

MANUAL PROCESS FOR DEVELOPING THE FAULT DICTIONARY

Figure 19:
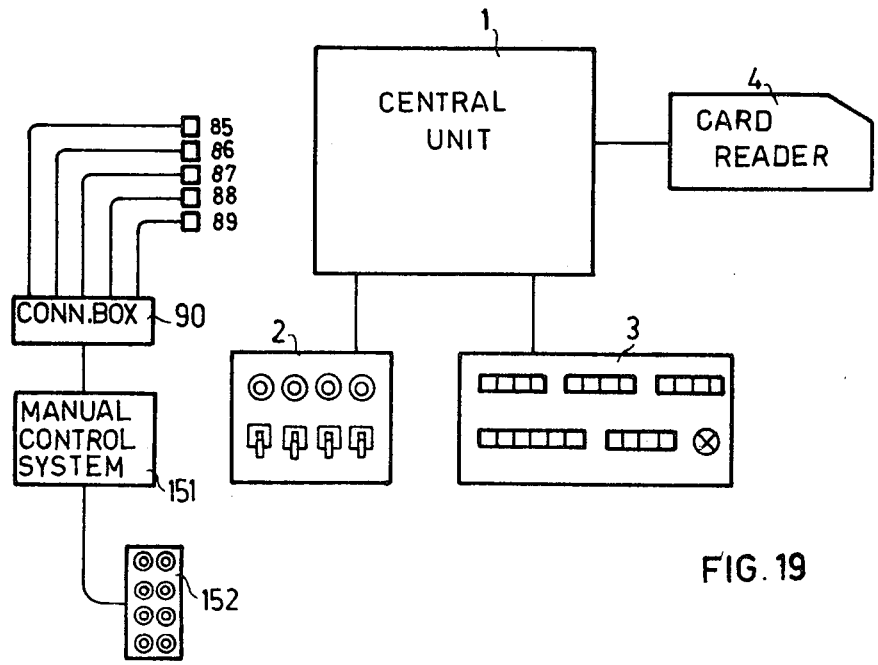
FIG. 19 is a block diagram of a system arrangement for manually developing a fault dictionary.

The fault-generating unit, as described, may be used to develop a fault dictionary by a manual procedure. The block diagram of such a system is represented in FIG. 19. It comprises, in addition to the elements shown in FIG. 1, a manual control system for the fault-generating unit. This manual control system 151 is provided with a fault generation control keyboard 152, and is connected to the fault-generating unit, previously described, which comprises connection box 90 and five fault-generating devices 80–84.

The operator has at his disposal a directory listing all of the printed circuit boards contained in the apparatus under test, the identification code of all the integrated circuit units comprised in each board, and a list of faults to be simulated for each integrated circuit unit. According to a predetermined program, the operator removes the first board from the apparatus under test and replaces it by a special board of the proper type with the interposition of a extension board. Then he removes the first integrated circuit unit of the special board and in its place plugs in the proper fault-generating device.

It is desirable to permit the entire diagnostic program to be read. No fault should be detected, thus indicating that the complete apparatus is operating correctly. Then, operating a key of keyboard 152, the operator causes the first programmed fault for the integrated circuit unit to be generated. In this condition, the operator actuates control board 2, controlling the cards of the diagnostic program to be read by card reader 4 according to the test procedure described previously. The artificially generated fault will cause the reading of the stack of cards to halt one or more times, and the operator will note the symptoms corresponding to the first fault of the first integrated circuit unit of the first printed circuit board. By operating keyboard 152 the operator then generates a second fault on the same unit, and, letting the diagnostic program be read another time, notes the symptoms related to this second fault. When all the faults intended to be generated on the first integrated circuit unit of the first circuit board have been simulated, the operator plugs back into its own socket the first integrated circuit unit, extracts the fault-generating device and proceeds as described above in respect to the second integrated circuit unit of the first circuit board. When this operation is accomplished for all the circuit units of the first board, the special board is taken out and the original board is replaced. The sequence of these operations is then repeated for the second board, and so on.

At the conclusion, there will be provided a list in which, for each fault of each circuit unit of each board, the related symptoms are specified. To obtain a practical and useful fault dictionary this list must be rearranged by listing all symptoms according to a predetermined sequence, and by indicating for each symptom the one or more integrated units and the one or more boards on which the faults which have caused the symptom, have been generated.

This operation needs only be executed one time for each different type or model of an apparatus. However, it is tedious and time consuming for an apparatus even moderately complicated.

AUTOMATIC PROCESS FOR DEVELOPING THE FAULT DICTIONARY

For these reasons, the above-indicated operations, according to the invention, are almost completely automated by the use of a pilot computer capable of executing all the operations which do not require mechanical modifications; that is, all but the manual operations for substituting the normal printed circuit boards with the special boards and for unplugging the integrated circuit units and substituting the fault-generating devices.

Figure 20:
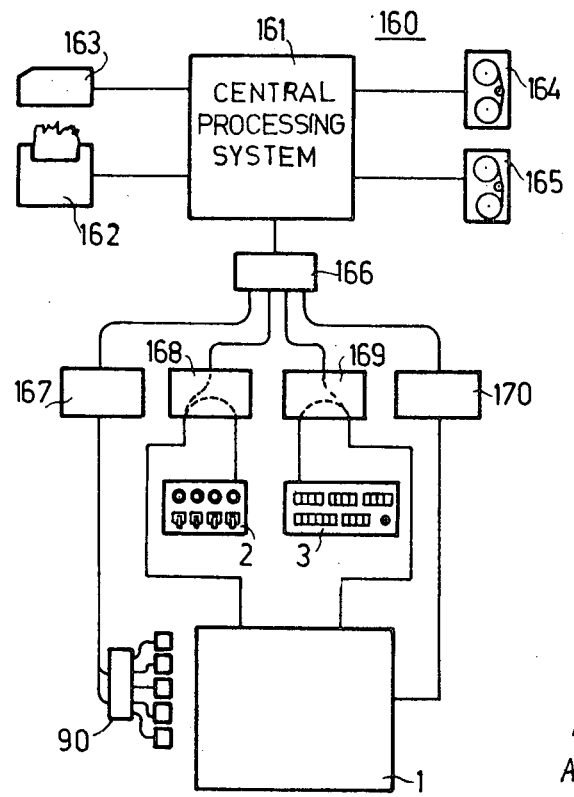
FIG. 20 is a block diagram of a complete system for automatically developing a fault dictionary.

The set of apparatus required for automating the method of the invention comprises, FIG. 20, the central processing unit 1 under test, its control keyboard 2, and its display board 3. There is also a pilot computer, indicated as a whole by the reference numeral 160, comprising a central processing unit 161 connected to peripheral units including a printer 162, a card reader 163, and two magnetic tape units 164 and 165. The computer is also connected to a multiple connecting unit 166. The object of unit 166 is to provide means for connecting four functional devices, which are capable of replacing the devices used in the manual operations described previously and of automatically performing the same functions, to the central processor of the pilot computer.

These functional devices are:
a. a control unit 167 of the fault generating unit,
b. a control keyboard automating device 168, associated with control keyboard 2,
c. a symptom recording device 169 associated with display board 3, and
d. a card reader simulating device 170.

Card reader 163 is loaded with a stack of cards, each one of which is related to a different integrated circuit unit of the central processor 1 under test and carries indicia for identifying and locating such integrated circuit unit and the list of the faults to be simulated therein.

Magnetic tape unit 164 is loaded with a magnetic tape on which the diagnostic program for central processor 1 is recorded. This diagnostic program is subdivided in blocks, each block containing the partial program contained in a perforated card of the aforementioned diagnostic program stack. Thus, magnetic tape unit 164 replaces card reader 4 of FIGS. 1 and 19. The block sequence is read from tape unit 164 under control of the central processor under test.

Magnetic tape unit 165 stores the sequence of symptoms correlated with the simulated faults. Printer 162 communicates to the operator the orders of the manual operations to be performed; that is, the replacement of a normal board by the corresponding special board, and the replacement of a plugged-in integrated circuit unit by the corresponding fault-generating device.

The operations of the four functional devices connected to the central processor of the pilot computer through multiple connection unit 166 are now described.

Control unit 167 of the fault-generating unit generates in succession, in accordance with the commands sent by the pilot computer, all the faults programmed for the different integrated circuit units by means of signals acting, through the adapting and amplifying circuits, on the control wires of the fault generating devices. Its operation is rendered effective and controlled by the voltage signals present on the signalling wire of the device in operation.

Control keyboard automating device 168 is parallel connected with keyboard 2, and is capable of sending to the central processor 1 under test, the same signals which would be sent by manual operation of keyboard 2. Particularly, after each halting of the diagnostic program, device 168 sends signals which restart the reading of the diagnostic program.

Symptom recording device 169 is parallel connected with display board 3. After each halting of the diagnostic program due to a fault, device 169 evaluates the data delivered by the state of the HALT lamp and the pattern of the on, off, or flickering lamps. The pilot computer records these data on the magnetic tape or tape unit 165, together with the serial number of the block on tape unit 164 which caused the halt, the indication of the simulated fault, and the identification and location of the integrated circuit unit subjected to the simulated fault.

Card reader simulating device 170 transfers to the pilot computer commands originating in the central processor 1 under test, which commands control the reading in succession of every block of the diagnostic program and writing it into the main memory of central processor 1 if no fault is detected at the end of the reading of the preceding block.

The sequence of operations is as follows:

As a preparatory operation the pilot computer controls reading the whole diagnostic program, block-by-block, and transferring these blocks through card reader simulator 170 into the memory of central processor 1. If the processor is fault-free, no halting will take place. After this, pilot computer 161 orders card reader 163 to read the first card, which contains the identification and location codes of the first integrated circuit unit and the list of the faults to be generated on it. In response, printer 162 prints out an order for the operator to replace the circuit board carrying this first integrated unit with the proper special board and to plug the proper fault-generating device in place of this first integrated unit.

The completion of this manual operation is signalled to the control unit of the fault-generating unit by the presence of a voltage on the signalling wire of the fault-generating device.

The pilot computer verifies that this manual operation has been correctly accomplished, and than commands the generation of the first fault through control unit 167 of the fault-generating unit.

Subsequently, the central processor under test, through card reader simulator 170, calls for reading in succession the blocks of the diagnostic program stored on the magnetic tape on magnetic tape unit 164. Usually, the fault generated on the first integrated circuit unit by the fault-generating device will cause one or more halts in the reading of the diagnostic program. At each halt, the central processor under test controls symptom recording device 169 to evaluate and, in turn, to control recording of the fault symptoms. Then, through operation of keyboard automating device 168, reading of the diagnostic program is resumed. The serial number of the last tape block read before each halt, the on, off, flickering pattern of the lamps, and the state of the HALT lamp are recorded on the tape of magnetic tape unit 165 concurrently with the indication of the generated fault and the identification and location codes of the integrated circuit unit affected by the fault.

At the end of the reading of the entire diagnostic program, all symptoms associated with the first fault generated on the first integrated circuit unit have been recorded on the magnetic tape on magnetic tape unit 165. Next, pilot computer 160, through control unit 167 of the fault-generating unit, provides for the second fault on the same integrated circuit unit to be generated, and the central processor unit under test calls for reading of the diagnostic program, thereby recording all symptoms associated to said second fault.

When all faults specified in the list related to the first integrated circuit unit under test have been generated, pilot computer 160 causes printer 162 to print the following order: for the operator to replace in its socket the first integrated circuit unit, to unplug the fault-generating device, to unplug a second integrated unit, and to plug into the protruding pins of the second unit's socket the proper fault-generating device. Thus, all symptoms related to all faults generated on the second integrated circuit unit of the first circuit board are recorded. This operation is repeated in succession, for the third, fourth, etc., integrated circuit unit.

When all integrated circuit units located on the first board have been subjected to the fault program, pilot computer 160 orders the operator, by means of the printer, to replace the first normal circuit board, after removing special board, and to replace a second normal board with the corresponding type of special board. The cycle of operation as indicated above is then repeated.

When all boards have been subjected to this process, the magnetic tape of tape unit 165 contains a list of symptoms, ordered according to the sequence of operations on each integrated circuit unit, determined, in turn, by the succession of cards read by card reader 163. In this list are all symptoms corresponding to the different faults generated on every integrated circuit unit. To obtain a fault dictionary, the pilot computer, or another computer, must rearrange the list of the symptoms to obtain a list ordered according to a suitable predetermined symptom order. In this ordered list each symptom or group of symptoms is correlated to the identification and location of one or more faulty integrated circuit units. For example, the ordering of the symptoms in the list may primarily follow the serial numbering of first tape blocks which cause the reading halt, and secondarily the numbers of other tape blocks which cause subsequent halts.

This list, once obtained, is printed and forms the actual fault dictionary placed at the disposal of the operator for carrying out the test procedure described.

Different changes and modifications of the described methods are possible; for instance, to enhance the reliability of the method, two different recordings on tape of the diagnostic program may be provided to be compared for detecting possible recording errors. Further, the entire diagnostic program may be read after each replacement of an integrated circuit unit, before generating faults. Moreover, a number of measures may be taken to provide easier and more rapid reference to the fault dictionary, for example by printing only the symptoms which are effective in identifying a faulty integrated circuit unit and by eliminating redundant information.

These and similar modifications of the described methods and apparatus of the invention are readily apparent to one skilled in the art, without departing from the spirit and scope of the invention.

We claim:

1. A method for generating diagnostic information for an electronic apparatus provided with input means for applying signals to internal input storage means and with output display means for revealing the states of predetermined output storage means, comprising the following steps:
producing circuit alterations simulating single faults in the set of all faults possible for the electronic apparatus,
supplying a sequence of diagnostic signals to said input means during the simulation of each said single fault, recording patterns of conditions of said output display means resulting from the application of said diagnostic signals, and generating a list correlating sets of fault symptoms to possible faults.

2. The method of claim 1, wherein said circuit alterations are obtained by selectively switching predetermined electrical connections using semiconductor means responsive to control signals.

3. The method of claim 1, wherein said sequence of diagnostic signals is subdivided in diagnostic blocks supplied to said input means, the sequence of supplying said diagnostic blocks being discontinued whenever the pattern of states of said output storage means at the end of a block deviates from an expected pattern of states.

4. Equipment for producing fault-simulating alterations in electronic data processing apparatus employing a plurality of first integrated circuit units carried by support members removable from said apparatus comprising:

a plurality of pluggable second integrated circuit units, each of said second units being substantially identical to at least one of said first integrated circuit units;

a removable substitute support member;

connection means on said removable substitute support member for enabling selective plugging of one of said second integrated circuit units or a fault-generating device to said substitute support member; and, a pluggable fault-generating device comprising a third integrated circuit unit substantially identical to one of said second integrated circuit units, alterable electrical paths coupling terminals of said third integrated circuit unit to corresponding terminals of said connection means when said fault-generating device is plugged with said connection means, and semiconductor switching means responsive to control signals for producing alterations in the electrical conditions of said electrical paths.

5. A method for generating diagnostic information for diagnosing faults in an electronic data processing apparatus employing first integrated circuit units carried by removable support members by means of a pilot computer, a substitute removable support member having removable second integrated circuit units thereon, and a fault-generating device, comprising:

a. selecting a location of a particular one of said integrated circuit units in said electronic data processing apparatus by means of a program of said pilot computer, b. displaying of an identification of said location by an output means of said pilot computer;

c. replacing manually, with a substitute removable support member, the one of said removable support member having said location thereon;

d. replacing manually said removable second integrated circuit unit at said location on said substitute support member with said fault-generating device;

e. verifying by electronic signalling means to said pilot computer the emplacement of said fault-generating device at said location;

f. actuating a simulated fault in said fault-generating device by means of a control signal transmitted from said pilot computer to said fault generating device;

g. applying a sequence of signals to said input means and recording fault-present output signals by said pilot computer;

h. recording differences between said fault-present output signals and fault-free output signals;

i. simulating a different fault at said location, recording differences between new fault-present output signals and said fault-free output signals, and repeating until results for all simulated faults at said location have been recorded;

j. repeating steps (a) through (i) for a plurality of other locations; and correlating said locations with said fault-present information to form a diagnostic dictionary.

* * * * *